Figure 1:
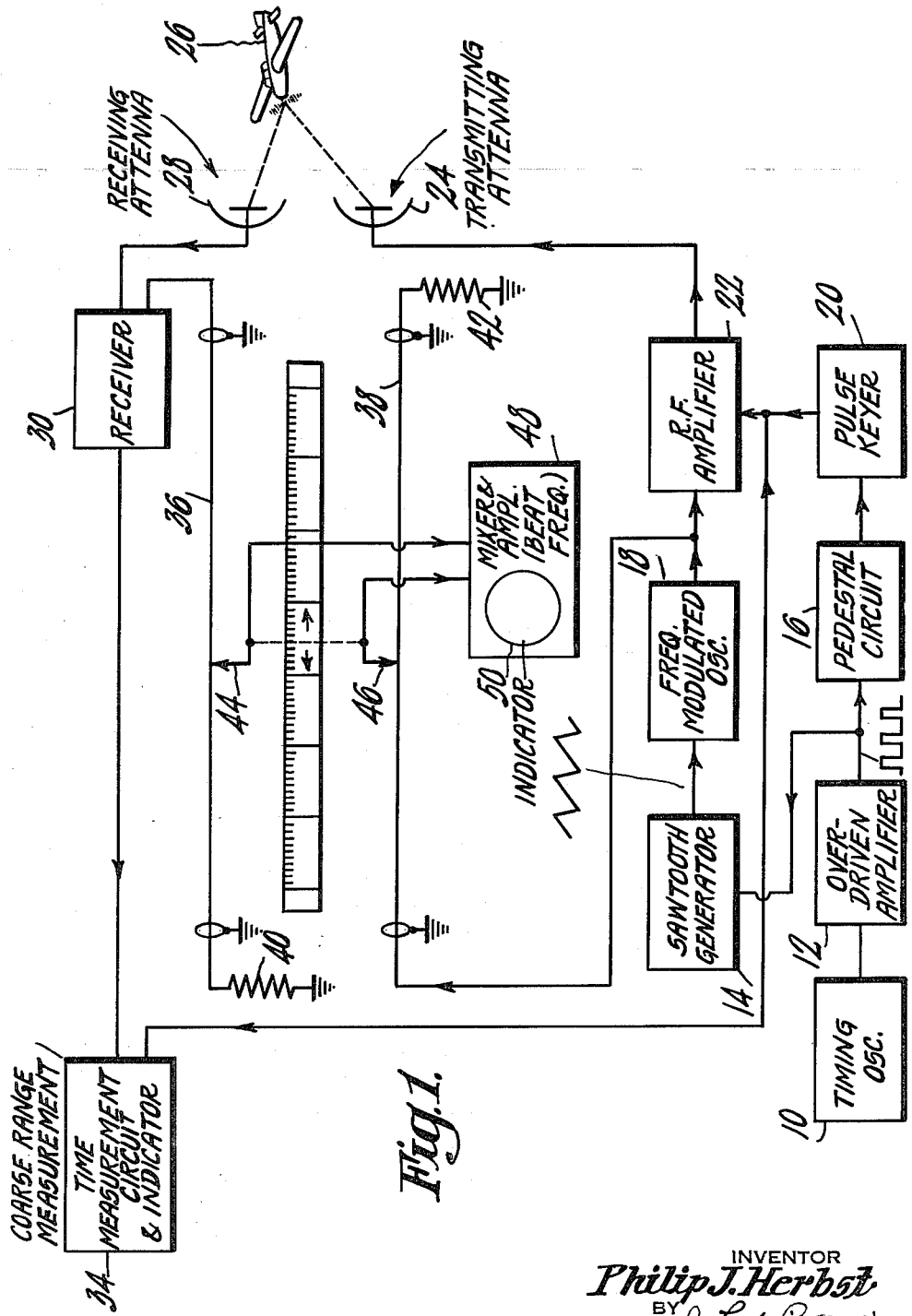

March 28, 1961

P. J. HERBST 2,977,587

FREQUENCY MODULATED PULSE RADAR

Filed Dec. 22, 1950

2 Sheets-Sheet 1

INVENTOR
Philip J. Herbst
BY
J. L. Whittaker
ATTORNEY

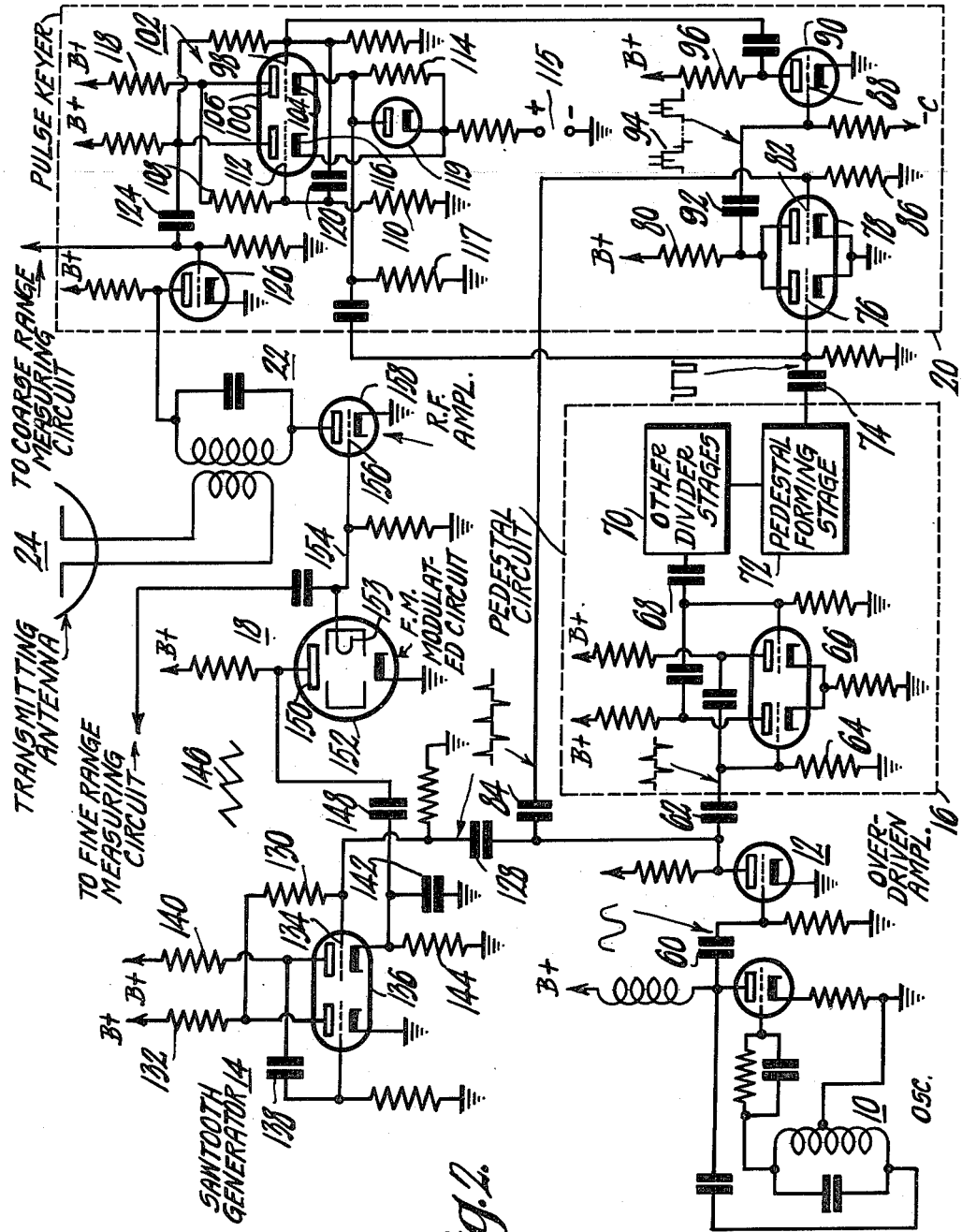

United States Patent Office 2,977,587
Patented Mar. 28, 1961

2,977,587
FREQUENCY MODULATED PULSE RADAR
Philip J. Herbst, Moorestown, N.J., assignor to Radio Corporation of America, a corporation of Delaware
Filed Dec. 22, 1950, Ser. No. 202,211
6 Claims. (Cl. 343—12)

This invention relates generally to radar (radio echo detection and ranging) systems, and more particularly to combined pulse echo and frequency modulation radar systems.

The most common type of radar systems at the present time are pulse echo detection systems. Also used for some purposes are frequency modulation radar systems. Frequency modulation (FM) radars are capable of extremely high precision, generally greater than that of pulse radar systems. Unfortunately, these FM radars are limited in range by the recurrence cycle of the frequency modulation. This recurrence cycle cannot be made very long to cover a great range without either decreasing the rate of change of frequency or increasing the total frequency deviation. Decreasing the rate of change of frequency results in a lower accuracy because in the limit it becomes impractical to determine with sufficient accuracy and speed a very low beat frequency. Even with the best modern generators known for the purpose, it is difficult to obtain a wide frequency deviation over a large percentage of the carrier frequency. For this and other reasons, increasing the frequency deviation does not make available to FM radar systems having large maximum ranges (say over 15,000 feet) the accuracy secured by pulse radar systems for both short and long ranges to be measured by the system. As a result, FM radar systems are generally restricted in use to those for ranges up to about 10,000 feet maximum, and these do not usually measure accurately extremely short ranges. The flexibility of the pulse radar system which measures with equal facility both long and short ranges is not available in the FM radar systems; and the precision achieved at the optimum ranges by FM radar systems is not available to pulse radar systems. The invention makes available a radar system which may have great maximum ranges, say many miles, and which, at the same time, affords the accuracy of measurement of an FM radar system over the entire range capabilities of the system.

It is an object of the present invention to improve radar systems.

It is a further object of the invention to improve radar range measurements.

A further object of the invention is to increase radar range accuracy.

Still other objects of the invention are to provide a novel and improved method and a novel and improved system of radar range measurement.

These and other objects, advantages, and novel features of the invention will be more apparent from the following description when taken in connection with the drawing in which like reference numerals refer to like parts and in which:

Fig. 1 is a schematic diagram partially in block form illustrating an embodiment of the invention; and Fig. 2 is a schematic diagram illustrating certain circuit details of Fig. 1.

In accordance with the novel method of the invention, radio frequency energy is generated at a pulse recurrence rate and having a regularly recurring frequency variation. Pulses of this frequency varying energy are transmitted for one or more sub-multiple periods of the frequency variation recurrence rate. The time between transmission of a pulse and reception of the echo is measured to derive a coarse range measure. The phase shift between the generated frequency modulated energy and the echo energy gives a fine range measure. Accordingly, the advantages of both pulse radar and FM radar are realized without serious disadvantages. The relatively high sensitivity and long range of pulse radar techniques are still available in the coarse range measurement. Determination of fine range is accomplished by the shift of frequencies over only the shorter FM cycle and the possible error of conventional FM measurements originating from the spurious signal arising at the crossover points of the envelopes of the reference and reflected signals is eliminated.

Apparatus for carrying the invention into practice may include a timing oscillator, a radio frequency energy generator, a keyer, and a transmitter. The frequency of the radio frequency generator is varied at a recurrence rate under control of the timing oscillator. The keyer controls the transmitter to transmit the energy during key-on periods and during certain sub-multiple cycles of the timing oscillator. Thus the transmitter transmits a pulse of energy having a duration of one or more periods of the timing oscillator and having a regular frequency variation controlled to be repeated during each period of the timing oscillator. A receiver of the system measures the time between transmission of an energy pulse and reception of the echo. A coarse range measurement may thus be derived. To derive a fine range measurement, the echoed energy and the received energy are each shifted in phase by different amounts until they are substantially in phase. The in-phase condition may be detected by zero beat on a beat frequency detector. The difference in the phase delays required to bring the generated energy and the echoed energy into phase gives a fine range measurement. In accordance with this feature of the invention, it is found convenient to employ two delay lines having the same physical and electrical lengths and each terminated at one end with a non-reflective termination. The other end of one line is connected to receive the echoed energy and the other end of the other line is connected to receive the frequency modulated radio frequency energy generated at the transmitter. The two lines are laid side by side with said one end of one line adjacent said one end of the other line and have movable pick-ups mechanically connected. The phase delays at the pick-ups are made equal by moving the pick-ups until zero beat is detected in a beat frequency detector to which both pick-ups are connected. At this point the position of the movable pick-ups is a measure of the difference in phase delays. The motion may be made against a calibrated scale which affords a fine reading of the range.

Referring now more particularly to Fig. 1 of the drawing, a timing oscillator 10 and overdriven amplifier 12 supply a square wave output for a period equal to that of the desired FM modulation cycle. A saw-tooth generator 14 and a pedestal circuit 16 are each connected to receive the square wave output of the overdriven amplifier 12. The period of one oscillation of the timing oscillator 10 and of a complete cycle of the square wave are equal to one period of the saw-tooth wave from saw-tooth generator 14 and to a period of the desired FM modulation cycle. A frequency modulated oscillator 18 is connected to be controlled by the saw-tooth output of the saw-tooth generator 14. The pedestal circuit 16 provides short duration pulses at a submultiple rate of the oscillator 10. The pulses from pedestal circuit 16 control a pulse keyer 20 connected thereto, controlling both the pulse repetition rate of the pulse keyer 20 and the pulse duration thereof.

A radio frequency amplifier 22 is connected to the pulse generator 20 to emit pulses of energy through the transmitting antenna 24 at the pulse repetition rate. The energy amplified by RF amplifier 22 is supplied by the frequency modulated oscillator 18. Accordingly, the energy transmitted from the antenna 24 is pulses of high frequency energy at a pulse repetition rate frequency modulated for example, from one radio frequency at the beginning of the pulse continuously and linearly increasing with time to a higher radio frequency at the end of the pulse. The transmitted energy may be assumed to strike some energy reflective object 26 and a portion thereof will be returned by way of echo to a receiving antenna 28. The antennas 24 and 28 are preferably arranged side by side with substantially coextensive highly directive patterns. A receiver 30 is connected to amplify and if desired to convert to a lower frequency the pulses received at antenna 28. The receiver may also include a detector in its final stage to provide detection of the received energy pulses. A time measurement circuit and indicator 34 is connected to receive the output pulses from receiver 30 and also the keying pulses from the keying pulse generator 20. The time measurement circuit 34 measures the time between transmission of a pulse from the antenna 24 and reception of the corresponding echoing at antenna 28 by any of the standard methods presently available for that purpose, many of which are well known to the radar art. For example, the pulse from the keying pulse generator 20 may initiate a time sweep base by deflection of the cathode ray of a cathode ray tube along one dimension. The output signal from the receiver 30 may be applied to deflect the beam in the other dimension. The position of the deflection of the beam in the other direction with respect to a point of initiation in the sweep affords a ready measurement of the range. The cathode ray tube may have a fluorescent screen with the beam intensity sufficient to make visible the trace of the beam and so afford an indication, readily calibrated, of the time interval to be measured. This indication affords a coarse range measurement.

To secure a fine range measurement, there are provided a pair of delay lines 36, 38 which may be shielded if desired. These lines may be either coaxial transmission lines, the inner conductor of which is coiled or which may have lumped circuit elements distributed along the length thereof, or simulated delay lines may be employed. Many forms of these are known. The delay lines 36, 38 have the same physical length and each has a non-reflective termination 40, 42, connected respectively at one end thereof. The other end of delay line 36 remote from termination 40 is connected to the antenna 28 or at some point in the receiver 30 prior to signal conversion to apply the received radio frequency signal to this other end of the line 36. The other end of delay line 38 remote from termination 42 is connected to receive a portion of the output of the frequency modulated oscillator 18. Pickup arms 44 and 46 are provided each of the lines 36, 38 respectively to pick up the delayed signals. In the case of coaxial delay lines, the pick-ups may be by probes, with some types of delay lines, the arms may contact spaced tops. The delay lines 36, 38 being of the same length are preferably positioned side by side with the non-reflective termination of one line adjacent the input to the other line. The pick-up arms 44, 46 are mechanically connected or gauged, to move together. The output from each of the pick-ups 44, 46 is applied to a mixer and amplifier 48 from which the beat frequency between the outputs from the two delay lines 36, 38 is derived. The mixer and amplifier 48 may include an indicator 50.

In operation, the pulse keyer 20 makes operative the RF amplifier 22 once every nth cycle of the oscillations of timing oscillator 10. The energy amplified and transmitted over transmitting antenna 24 is in this instance a single cycle of the FM modulation of the radio frequency generated in FM oscillator 18. The received energy is applied to delay line 36 and the generated FM modulated energy is applied to delay line 38. The delay lines are each sufficiently long to afford a maximum delay of at least one half of the period of an FM cycle. Thus it will be apparent that the motion of the pick-ups 44, 46 in their travel between the ends of the lines 36, 38 always encompass a point at which the energy picked up by pick-up 44 is in phase with the energy picked up by pick-up 46. In other words, there is always at least one point at which the indicator 50 of the mixer and amplifier 48 indicates a zero beat between the two pick-ups. Thus the calibration of the scale under the pick-ups 44, 46 may afford a fine reading which gives the range to the object 26 within some certain period of the timing oscillator 10. The coarse range is derived as explained hereinbefore by standard radar techniques by the time measurement circuit and indicator 34. By way of example, the desired range of the radar set may be 300 miles. The corresponding radar time is substantially 3000 microseconds (the time required for a signal to travel 600 miles in air). The transmitter pulse may be 6 microseconds in duration and include one FM cycle of 6 microseconds. The maximum delay time afforded by each of the lines 36, 38 by itself may be 3 microseconds. Lumped constant delay lines are known, for example, for which a 100 section line will have an accuracy of within 1 percent. With these figures as examples, the accuracy of the pulse radar system in measuring the coarse range may be taken to be approximately 3 microseconds. The accuracy of measurement of the fine range may be taken to be .03 microsecond. Therefore, the accuracy of the system as determined by the accuracy of the fine range measurement will always be within 15 feet. If it is desired to increase the transmitter duty cycle, the pulse keyer 20 may include a pulse stretcher, and the transmitted pulse may include, say 5 periods of the timing oscillator and may be 30 microseconds in duration. If desired, the accuracy can be further improved by employing a short length measuring line capable of indicating increments and a number of sections of precisely constructed lines each representing the total delay measured by the precision line. These increments are added to one end of the precision line to bring the position of phase agreement within its limits. In this case, however, the resulting accuracy will be dependent upon the sum of errors in the incremental section.

Referring now more particularly to Fig. 2, the oscillator 10 is exemplified by a Hartley oscillator which produces a substantially sinusoidal wave form. It will be understood that other types of oscillators may be employed if desired. The output of the Hartley oscillator is coupled by a capacitor 60 to an overdriven amplifier 12. The amplifier 12 is driven both beyond so-called saturation and beyond cutoff so that the output thereof is substantially a square wave. The output of the amplifier 12 is coupled by a differentiating circuit comprising a capacitor 62 and a grid resistor 64 to the first stage 66 of the pedestal circuit 16. The pedestal circuit 16 is enclosed in dotted lines. The frequency division circuit 66 is a conventional relaxation oscillator which has one cycle of oscillation for an integral number for the applied input pulses. The output of the relaxation oscillator 66 may be applied by capacitor 68 to other divider stages 70 and thence to a pedestal forming stage 72. The divider stages are optional and depend upon an amount of frequency division desired. The pedestal forming stage 72 may consist of a so-called "monostable" of "one kick" multivibrator. These signal pulse multivibrators have one condition of stable equilibrium and a second condition of unstable equilibrium. For examples of such monostable multivibrators, see for example, Volume 20 of Radiation Laboratory Series, Electronic Time Measurements, edited by Chance and others, particularly section 5.5 beginning at page 166, and the circuit illustrated in Fig. 5.14. Upon reception of a pulse, the monostable multivibrator circuit is driven by the incoming pulse of a specified polarity to its condition of unstable equilibrium where, however, it remains only for a predetermined time interval after which it returns to its condition of stable equilibrium. There is thereby produced a single pulse which in this case will be assumed to be negative-going of the predetermined time interval. These pulses will occur at a frequency determined by the frequency divider circuits and thus at integral periods of the timing oscillator oscillations. The predetermined time interval of the pulse is in this case chosen to be between one and two periods of the timing oscillator 10, and is applied from pedestal forming stage 72 by way of a capacitor 74 to the grid 76 of a duo-triode 78 which is connected in a mixing circuit with the cathodes grounded. The anodes have a common anode resistor 80. The other grid 82 is connected to receive the signals from the output of the overdriven amplifier 12 after differentiation by a capacitor 84 and grid resistor 86. Because of the specified duration of the negative-going pulse applied at grid 76, similar shaped positive-going pulses of the same duration are developed across anode resistor 80 and upon these are superimposed at least two of the differentiated pulses of the overdriven amplifer 12. It may be necessary to shift the phase of one of the signals on these grids 76, 82 by means not shown but known to the art, to secure the desired superpositioning of the pulse. There is therefore applied to the grid 88 of tube 90 through capacitor 92 a wave shape somewhat of the form illustrated at 94 on the figure. The tube 90 is connected in an amplifier circuit biased sufficiently far beyond cutoff so that only the two superimposed pulses separated by an interval of one period of the timing oscillator 10 are amplified across the anode resistor 96 of tube 90. The two negative-going pulses thus produced across anode resistor 96 are separated by substantially one cycle of the timing oscillator 10. These negative-going pulses are applied to one grid 98 of a double triode 100 connected in a circuit 102. The circuit 102 is of the multivibrator type which changes operating conditions on the successive application of signals of the same polarity. The right-hand section including the grid 98, cathode 104, and anode 106 of tube 100 is biased to normally draw anode current thereby reducing the potential at the anode 106 and consequently maintaining at a reduced potential, through the divider system comprising resistors 108 and 110, the potential at the grid 112 of the left-hand section. The cathode 104 is connected through a resistor 114 to a positive bias source 115, the purpose of which appears hereinafter. The cathode 116 of the left hand section of tube 100 is directly connected to bias source 115. The potential applied to the grid 112 of the left-hand section and the bias voltage are chosen to prevent current flow in the left-hand section in the tube condition when current flows in the right hand section. This is a stable condition. When the negative-poled pulse is applied to the grid 98, from tube 90, the anode current through anode resistor 118 is reduced causing an increase in the voltage at grid 112 and the tube then assumes another condition of stability in which current flows through the left-hand section. The next negatively-poled pulse from tube 90 then drives the left-hand section to cutoff (when it is applied to grid 112 through capacitor 120) and the initial condition of stability is resumed. To assure that the first of each pair of negatively poled pulse finds the right hand section of tube 100 in a conductive condition, a differentiating circuit 117 differentiates the pedestal from the pedestal circuit 16, and applies the differentiated pulse to right hand section cathode 104. If the left hand section of tube 100 is then conducting, the condition of circuit 102 is thereby changed by the negative pulse from differentiation of the leading edge of the negatively poled pedestal pulse just before the first of the pair of negative going pulses selected by the mixing circuit are applied to right hand section grid 98. The positive going pulses from differentatior may be suppressed by a diode 119 connected across resistor 114. If desired, a common cathode resistor may be connected between the bias source 115 and the diode 119, as shown. Provision is made to re-set the multivibrator circuit 102 by the means just described. Other versions of this or similar circuits are known for procuring the desired single output pulse which in this instance is taken from the anode 122 and applied through capacitor 124 as a negative-going pulse to the amplifier 126.

Tube 126 inverts the negative-going pulse and amplifies it to provide a positive-going keying pulse to the radio frequency amplifier 122. The radio frequency amplifier 122 is thus effective to amplify radio frequency energy and supply such energy to the transmitting antenna 24 only during the duration of the keying pulse.

The saw-tooth generator 14 is one of many types which may be employed. The pulses from the overdriven amplifier 12 are differentiated by the combination of capacitor 128 and resistor 130 and anode resistor 132. The left-hand section of the double triode 136 shown is normally conductive. When the positive-going portion of the differentiated signal from overdriven amplifier 12 is applied to grid 134 of the right-hand section of the tube, it causes this section to start conduction. The other cutoff by the voltage fed through capacitor 138 developed across anode resistor 140. This action causes a voltage to be developed across anode resistor 132, which drives the grid 134 of the right-hand section still more positively and quickly charges the capacitor 142. When the positive-going pulse is removed from the grid 134, the left-hand section of the double triode 136 quickly returns to a conducting condition and the right-hand section 134 is quickly cut-off. The charge stored on capacitor 142 then slowly leaks off through resistor 144. By choosing appropriately the circuit values of the resistor 144, capacitor 142 combination, a serrated or saw-tooth wave form such as 146 having a substantially linear rise of voltage and a very much faster drop of voltage for each cycle is developed.

This saw-tooth wave form 146 is applied through capacitor 148 to the frequency controlling element 150 of the frequency modulated oscillator 18 which is shown in this case as comprising a klystron type tube or velocity modulated tube 152. The element 150 is the reflector element of the tube 152. It is well known that within certain limitations the frequency which is caused by the change of voltage applied to this element is substantially linear with the voltage applied. The frequency modulated radio frequency energy may be withdrawn by a loop 153 on a line 154 which normally would be a coaxial cable although the showing of the outer conductor is here omitted. This voltage is applied to the grid 156 of the radio frequency amplifier tube 158 which is keyed by the pulses from tube 126 as hereinbefore explained. A small portion of this frequency modulated radio frequency energy is also taken for application to the fine range measuring circuit (shown in Fig. 1) at the end of delay line 38 remote from the resistor 42. It may be necessary to include various phase control elements at different portions of the circuit but these have been omitted for convenience and simplicity. All of the components displayed in Fig. 2 are known, and in fact, several equivalents are known for all of them. It will be appreciated that the circuits may be arranged to produce an output pulse from the transmitting antenna having the duration of several frequency modulating cycles if desired.

Although the means employed here for comparing the phase shift in a frequency modulated signal is essentially one of finding the beat frequency between the transmitted and received energy by using a phase shift, it will be appreciated that the beat frequency may be measured by other conventional means. For example, the energy from antenna 28 and the energy from the frequency modulated oscillator 18 may be injected on different elements of the same tube (for example control and screen grids) and the signal from a local oscillator injected on still another element thereof (such as the cathode). The resultant intermediate frequency will contain the beat frequency between the received signal and the frequency modulated generator signal as a modulation which can then be amplified by conventional means and detected by any suitable discrminator. This beat frequency can give directly an indication of the fine reading or again a phase shifting device may be employed to bring the beat frequency to zero, the degree of phase shift necessary being used for a fine measure of the range.

It is apparent that with the method and system described herein, the greater accuracy of which frequency modulation radar is capable is now available with the greater ranges characteristic of pulse radar. A coarse measure of the range is secured by standard pulse radar techniques and a fine measue of the range is secured by deriving a zero beat note between the echoed and generated frequency modulated energy, or by measuring the beat frequency between them.

What is claimed is:

1. A distance measuring apparatus comprising a timing oscillator, a generator of radio frequency energy the frequency of which is varied under control of said oscillator, a keyer, a transmitter connected to said generator to transmit said radio frequency energy only during key-on periods and under control of said keyer, said keyer being connected in a circuit with said oscillator to key said transmitter on during submultiple frequency periods of said oscillator whereby said transmitter transmits frequency varied energy pulses, a receiver receiving the echoes of said energy pulses from echoing objects, means connected to said receiver and said oscillator to measure the time between transmission of each energy pulse and reception of the echo thereof, and frequency shift measuring means to measure the frequency shift between said echoes and the generated energy comprising a pair of delay lines of the same physical and electrical length, each having one non-reflective termination at one end and each connected at the other end respectively to receive energy from said receiver and to receive energy from said rado frequency generator, said lines each having a pick-up movable together to maintain equal the distances respectively between one said pick-up and the termination of one line and the other said pick-up and said other end of the other line, whereby the pick-ups may be moved to a point at which the received and reflected signals are in phase, the position of said pick-ups being calibrated thereby to give a fine range reading.

2. A distance measuring apparatus comprising a timing oscillator, a generator of radio frequency energy the frequency of which is varied under control of said oscillator, a keyer, a transmitte connected to said generator to transmit said radio frequency energy during key-on periods only and under control of said keyer, said keyer being connected in a circuit with said oscillator to key said transmitter on during submultple frequency periods of said oscillator whereby said transmitter transmits frequency varied energy pulses, a receiver receiving the echoes of said energy pulses from echoing objects, means connected to said receiver and said oscillator to measure the time between transmission of each energy pulse and reception of the echo thereof, and frequency shift measuring means to measure the frequency shift between said echoes and the generated energy, said frequency shift measuring means including a delay line connected to receive energy from said oscillator.

3. A distance measuring apparatus comprising a timing oscillator, a generator of radio frequency energy the frequency of which is varied under control of said oscillator, a keyer, a transmitter connected to said generator to transmit said radio frequency energy during key-on periods only and under control of said keyer, said keyer being connected in a circuit wth said oscillator to key said transmitter on during submultiple frequency periods of said oscillator whereby said transmitter transmits frequency varied energy pulses, a receiver receiving the echoes of said energy pulses from echoing objects, means connected to said receiver and said oscillator to measure the time between transmission of each energy pulse and reception of the echo thereof, and frequency shift measuring means to measure the frequency shift between said echoes and the generated energy, said frequency shift measuring means including a delay line connected to receive energy from said oscillator, and a second delay line connected to receive energy from said receiver.

4. A distance measuring apparatus comprising a timing oscillator, a generator of radio frequency energy the frequency of which is varied under control of said oscillator, a keyer, a transmitter connected to said generator to transmit said radio frequency energy during key-on periods only and under control of said keyer, said keyer being connected in a circuit with said oscillator to key said transmitter on during submultiple frequency periods of said oscillator whereby said transmitter transmits frequency varied energy pulses, a receiver receiving the echoes of said energy pulses from echoing objects, means connected to said receiver and said oscillator to measure the time between transmission of each energy pulse and reception of the echo thereof, and frequency shift measuring means to measure the frequency shift between said echoes and the generated energy, said frequency shift measuring means including a pair of delay lines, each having one non-reflective termination at one end and each connected at the other respectively to receive energy from said receiver and to receive energy from said radio frequency generator, a pair of movable pick-ups connected each to receive energy respectively from each line, and means connected to receive the energy from said pick-ups and compare the phase thereof.

5. A distance measuring apparatus comprising a timing oscillator, a generator of radio frequency energy the frequency of which is varied under control of said oscillator, a keyer, a transmitter connected to said generator to transmit said radio frequency energy during key-on periods only and under control of said keyer, said keyer being connected in a circuit with said oscillator to key said transmitter on during submultiple frequency periods of said oscillator whereby said transmitter transmits frequency varied energy pulses, a receiver receiving the echoes of said energy pulses from echoing objects, means connected to said receiver and said oscillator to measure the time between transmission of each energy pulse and reception of the echo thereof, and frequency shift measuring means to measure the frequency shift between said echoes and the generated energy, said frequency shift measuring means including delay lines connected to receive enrgy from said oscillator and from said receiver.

6. A distance measuring apparatus comprising a timing oscillator, a generator of radio frequency energy the frequency of whch is varied under control of said oscillator, a keyer, a transmitter connected to said generator to transmit said radio frequency energy during key-on periods only and under control of said keyer, said keyer being connected in a circuit with said oscillator to key said transmitter on during submultiple frequency periods of said oscillator whereby said transmitter transmits frequency varied energy pulses, a receiver receiving the echoes of said energy pulses from echoing objects, means connected to said receiver and said oscillator to measure the time between transmission of each energy pulse and reception of the echo thereof, and frequency shift measuring means to measure the frequency shift between said echoes and the generated energy, said frequency shift measuring means including delay lines connected to receive energy from said receiver and from said oscillator and having a variable pick-up for said lines and a null detector connected to said pick-up to detect a null frequency shift at the pick-up.

References Cited in the file of this patent
UNITED STATES PATENTS

| | | |
|---|---|---|
| 2,522,367 | Guanella | Sept. 12, 1950 |
| 2,525,328 | Wolff | Oct. 10, 1950 |
| 2,541,066 | Jaynes | Feb. 13, 1951 |
| 2,542,182 | Crump | Feb. 20, 1951 |
| 2,557,156 | Sulzer | June 19, 1951 |